(12) United States Patent
Zhou

(10) Patent No.: US 12,117,053 B2
(45) Date of Patent: Oct. 15, 2024

(54) CLUTCH ACTUATOR, DETECTION SYSTEM AND METHOD FOR DETECTING AN ANGULAR POSITION OF A ROTARY COMPONENT

(71) Applicant: Schaeffler Technologies AG & Co. KG, Herzogenaurach (DE)

(72) Inventor: Jie Zhou, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/794,256

(22) PCT Filed: Jan. 12, 2021

(86) PCT No.: PCT/DE2021/100018
§ 371 (c)(1),
(2) Date: Jul. 21, 2022

(87) PCT Pub. No.: WO2021/151417
PCT Pub. Date: Aug. 5, 2021

(65) Prior Publication Data
US 2023/0046131 A1 Feb. 16, 2023

(30) Foreign Application Priority Data
Jan. 29, 2020 (DE) ............... 10 2020 102 064.3

(51) Int. Cl.
*F16D 48/06* (2006.01)
*G01D 5/14* (2006.01)

(52) U.S. Cl.
CPC ........... *F16D 48/064* (2013.01); *G01D 5/145* (2013.01); *F16D 2500/1023* (2013.01);
(Continued)

(58) Field of Classification Search
CPC ........... F16D 48/064; F16D 2500/1023; F16D 2500/3021; F16D 2500/501; F16D 2500/70605; G01D 5/145
See application file for complete search history.

(56) References Cited

U.S. PATENT DOCUMENTS

| | | | |
|---|---|---|---|
| 2013/0265037 A1* | 10/2013 | Friedrich | G01R 33/09 324/207.2 |
| 2014/0354271 A1* | 12/2014 | Kawase | G01D 5/2451 324/207.25 |
| 2015/0160042 A1* | 6/2015 | Bogos | G01D 5/20 324/207.15 |

FOREIGN PATENT DOCUMENTS

| | | |
|---|---|---|
| CN | 101398313 A | 4/2009 |
| CN | 101398316 A | 4/2009 |

(Continued)

*Primary Examiner* — Stephanie E Bloss
*Assistant Examiner* — Michael A Harrison
(74) *Attorney, Agent, or Firm* — Volpe Koenig

(57) ABSTRACT

A first sensor signal and a second sensor signal are provided by a sensor unit to an evaluation unit. The first sensor signal is dependent on the angular position and is associated with a first detection position, and the second sensor signal is associated with a second detection position lying about the rotational axis perpendicular to the first detection position. An orthogonal error is converted by the evaluation unit into an amplitude difference between respective amplitudes of the first and second sensor signals based on a coordinate transformation of the first and second sensor signals. Each of the first and second sensor signals are adjusted by the evaluation unit based on the amplitude difference. An angular position of a rotational component is determined by the evaluation unit based on output from an a tan 2-function that takes the adjusted first and second sensor signals as input.

16 Claims, 5 Drawing Sheets

(52) U.S. Cl.
    CPC ............... *F16D 2500/3021* (2013.01); *F16D 2500/501* (2013.01); *F16D 2500/70605* (2013.01)

(56) References Cited

FOREIGN PATENT DOCUMENTS

| | | |
|---|---|---|
| CN | 202855522 U | 4/2013 |
| CN | 206583466 U | 10/2017 |
| CN | 108627082 A | 10/2018 |
| CN | 109579768 A | 4/2019 |
| CN | 110095118 A | 8/2019 |
| DE | 10034733 A1 | 2/2001 |
| DE | 19934478 A1 | 2/2001 |
| DE | 69518964 T2 | 2/2001 |
| DE | 102017202218 A1 | 8/2018 |
| DE | 102017128891 A1 | 6/2019 |
| DE | 102018131708 A1 | 6/2020 |
| JP | 2000074662 A | 3/2000 |
| JP | 2003149003 A | 5/2003 |
| WO | 2006132118 A1 | 12/2006 |
| WO | 2018219388 A1 | 12/2018 |
| WO | 2021151418 A1 | 8/2021 |

* cited by examiner

CLUTCH ACTUATOR, DETECTION SYSTEM AND METHOD FOR DETECTING AN ANGULAR POSITION OF A ROTARY COMPONENT

CROSS-REFERENCE TO RELATED APPLICATIONS

This application is the U.S. National Phase of PCT Appln. No. PCT/DE2021/100018 filed Jan. 12, 2021, which claims priority to DE 102020102064.3 filed Jan. 29, 2020, the entire disclosures of which are incorporated by reference herein.

TECHNICAL FIELD

The disclosure relates to a method for detecting an angular position of a rotational component. Furthermore, the disclosure relates to a detection system and a clutch actuator.

BACKGROUND

A method for detecting an angular position of a rotational component is described, for example, in WO 2018/219388 A1. A method for detecting an angular position of a rotational component that can rotate about a rotational axis is described therein, in which the angular position of the rotational component is detected by a sensor system arranged radially at a distance from the rotational axis. A magnetic ring arranged fixedly and concentrically on the rotating component causes a magnetic field that changes relative to the sensor system and is detected by the sensor system, wherein a signal picked up by the sensor system is evaluated with regard to the angular position. The signal picked up by the sensor system is evaluated with regard to amplitude information of the magnetic field and a correction parameter is determined from the amplitude information, by means of which an angular error in the angular position picked up from the signal of the sensor system is determined. The angular error is then used to correct the angular position determined from the signal output by the sensor system.

SUMMARY

The disclosure provides an exemplary embodiment for detecting an angular position more accurately and quickly. The angular error caused by the orthogonal error can be compensated for. This makes it easier and faster to detect the angular position with reduced angular error.

A sensor unit and the rotational component can be arranged in a vehicle. The rotational component and a rotary element may be arranged to be concentrically rotatable. The sensor unit can be designed as an angle sensor.

The sensor element can be a Hall sensor.

The rotational element can be a magnetic ring. The rotational element can be a permanent magnet. The rotational element can be diametrically magnetized.

A first and/or second sensor signal can be a periodic signal. The first sensor signal can be a cosine signal, and the second sensor signal can be a sinusoidal signal.

An orthogonal error between the first sensor signal $S_1$ and the second sensor signal $S_2$ affecting an angular position $\alpha$ can be described via an offset angle $\varphi$ as follows $$\begin{bmatrix} S_1 \\ S_2 \end{bmatrix} = \begin{bmatrix} \cos(\alpha) \\ \sin(\alpha + \varphi) \end{bmatrix} \quad (1)$$

Knowing the offset angle $\varphi$, a second sensor signal $S^{}_2$ adjusted for the orthogonal error could be calculated according to the following $$S^{}_2 = \frac{S_2}{\cos(\varphi)} - S_1 \cdot \tan(\varphi) \quad (2)$$

The calculation of the offset angle $\varphi$, which has to be determined in advance for this purpose, is computationally expensive, time-consuming and uneconomical to perform while the sensor unit is in operation using conventional methods.

Instead of determining the offset angle $\varphi$, an orthogonal error can be suitably transformed into an amplitude difference of the amplitudes a, b of the sensor signals in a correction step preceding an evaluation step via the following coordinate transformation of the first and second sensor signals $S_1$, $S_2$ $$\begin{bmatrix} S_1 \\ S_2 \end{bmatrix} = \begin{bmatrix} \cos(\alpha) \\ \sin(\alpha + \varphi) \end{bmatrix} = \begin{bmatrix} \cos\left(\frac{\pi}{4}\right) & -\sin\left(\frac{\pi}{4}\right) \\ \sin\left(\frac{\pi}{4}\right) & \cos\left(\frac{\pi}{4}\right) \end{bmatrix} \cdot \begin{bmatrix} a \cdot \cos(\alpha + \alpha_0) \\ b \cdot \sin(\alpha + \alpha_0) \end{bmatrix} \quad (3)$$

A phase shift $\alpha_0$ of the two sensor signals can be taken into account in this regard.

The coordinate transformation can be performed in a conversion step associated with the correction step. Preferably, a coordinate rotation of 45° is performed during the coordinate transformation, corresponding to $$\frac{\pi}{4}$$

with the rotation matrix $$\begin{bmatrix} \cos\left(\frac{\pi}{4}\right) & -\sin\left(\frac{\pi}{4}\right) \\ \sin\left(\frac{\pi}{4}\right) & \cos\left(\frac{\pi}{4}\right) \end{bmatrix}^{-1} = \frac{\sqrt{2}}{2} \cdot \begin{bmatrix} 1 & 1 \\ -1 & 1 \end{bmatrix} \quad (4)$$

whereby the coordinate rotation resulting in the converted first sensor signal $S^*_1$ and the converted second sensor signal $S^*_2$ can be calculated as follows $$\begin{bmatrix} S^*_1 \\ S^*_2 \end{bmatrix} = \frac{\sqrt{2}}{2} \cdot \begin{bmatrix} S_1 + S_2 \\ S_2 - S_1 \end{bmatrix} = \begin{bmatrix} a \cdot \cos(\alpha + \alpha_0) \\ b \cdot \sin(\alpha + \alpha_0) \end{bmatrix} \quad (5)$$

If the converted sensor signals $S^*_1$, $S^*_2$ are transferred as arguments to an a tan 2 function in a subsequent evaluation step for calculating the angular position $\alpha$, the converted sensor signals $S^*_1$, $S^*_2$ can also be calculated while omitting the prefactor via a subtraction and addition of the first and second sensor signals $S_1$, $S_2$ as follows $$\begin{bmatrix} S^*_1 \\ S^*_2 \end{bmatrix} = \begin{bmatrix} S_1 + S_2 \\ S_2 - S_1 \end{bmatrix} \quad (6)$$

The conversion step can be preceded by a normalization step that performs an offset correction and/or an amplitude correction of the unprocessed first and second sensor signals $S_1^0$, $S_2^0$ output by the sensor unit and then transfers the corrected first and second sensor signals $S_1$, $S_2$ to the conversion step.

In a calculation step associated with the correction step and following the conversion step, the converted first and second sensor signals $S^*_1$, $S^*_2$ can be adjusted for the amplitude difference and transferred to the evaluation step as an adjusted first sensor signal $S^{}_1$ and as an adjusted second sensor signal $S^{}_2$. In this regard, the amplitude $A^*_1$ of the converted first sensor signal $S^*_1$ can be calculated according to $$A^*_1 = \max(S^*_1) - \min(S^*_1) \tag{7}$$

and the amplitude $A^*_2$ of the converted second sensor signal $S^*_2$ can be calculated according to $$A^*_2 = \max(S^*_2) - \min(S^*_2) \tag{8}$$

Then the amplitude difference $\gamma$ can be calculated as follows $$\gamma = \frac{a}{b} = \frac{A^*_1}{A^*_2} \tag{9}$$

Subsequently, the amplitude difference can be compensated for by adjusting the amplitude of the converted second sensor $S^*_2$ signal by applying $$A^{**}_2 = A^*_2 \cdot \gamma \tag{10}$$

and the converted first and second sensor signals $S^*_1$, $S^*_2$ are transferred to the evaluation step as an adjusted first sensor signal $S^{}_1$ and an adjusted second sensor signal $S^{}_2$.

In the evaluation step, the angular position $\alpha$ can be calculated using an a tan 2 function with the adjusted first and second sensor signals $S^{}_1$, $S^{}_2$.

Here, the maximum angular error $\epsilon^*_{max}$ caused by the amplitude difference 7 is defined as follows $$\epsilon^*_{max} = \arcsin\left[\frac{\gamma - 1}{\gamma + 1}\right] \tag{11}$$

The offset angle $\varphi$ can be calculated with the amplitude difference $\gamma$ by transforming (3) as follows $$\varphi = 2 \cdot \arctan\left(\frac{\gamma - 1}{\gamma + 1}\right) \tag{12}$$

Thus, the maximum angular error $\epsilon_{max}$ caused by the orthogonal error corresponding to the offset angle $\varphi$ can be calculated as follows $$\epsilon_{max}(\varphi) = \arcsin\left[\tan\left(\frac{\varphi}{2}\right)\right] + \frac{\varphi}{2} \tag{13}$$

The evaluation step can comprise a phase correction step in which the common phase shift $\alpha_0$ of the first and second sensor signals $S_1$, $S_2$ is calculated and the angular position $\alpha$ is adjusted for this phase shift $\alpha_0$ and output. The phase shift $\alpha_0$ can be determined as follows $$\alpha_0 = -\arctan\left(\frac{1}{\gamma}\right) \tag{14}$$

and be taken into account as a phase correction $\alpha^*_0$ via the following relation $$\alpha^*_0 = -\alpha_0 + \varphi = \arctan\left(\frac{1}{\gamma}\right) + 2 \cdot \arctan\left(\frac{\gamma - 1}{\gamma + 1}\right) - \frac{\pi}{2} \tag{15}$$

The phase correction step may be performed after applying the a tan 2 function.

Furthermore, a detection system for detecting an angular position of a rotational component is achieved by a method having at least one of the features indicated above. The detection system comprises an evaluation unit and a sensor unit comprising a fixed sensor element and a rotational element rotatable relative thereto and jointly with the rotational component.

Furthermore, a clutch actuator for clutch actuation, having such a detection system, is provided. The clutch actuator can operate a clutch designed as an e-clutch in a vehicle. The clutch actuator can be a modular clutch actuator, or MCA for short. This can include a rotor and a spindle. The rotor can perform a rotational movement, which is converted into a linear movement of the spindle via a planetary roller screw drive, abbreviated PWG. The linear motion of the spindle can actuate the clutch.

Further advantages and advantageous embodiments of the disclosure are apparent from the description of the figures as well as the figures themselves.

BRIEF DESCRIPTION OF THE DRAWINGS

The disclosure is described in detail below with reference to the figures. In the figures.

DETAILED DESCRIPTION

Figure 1:
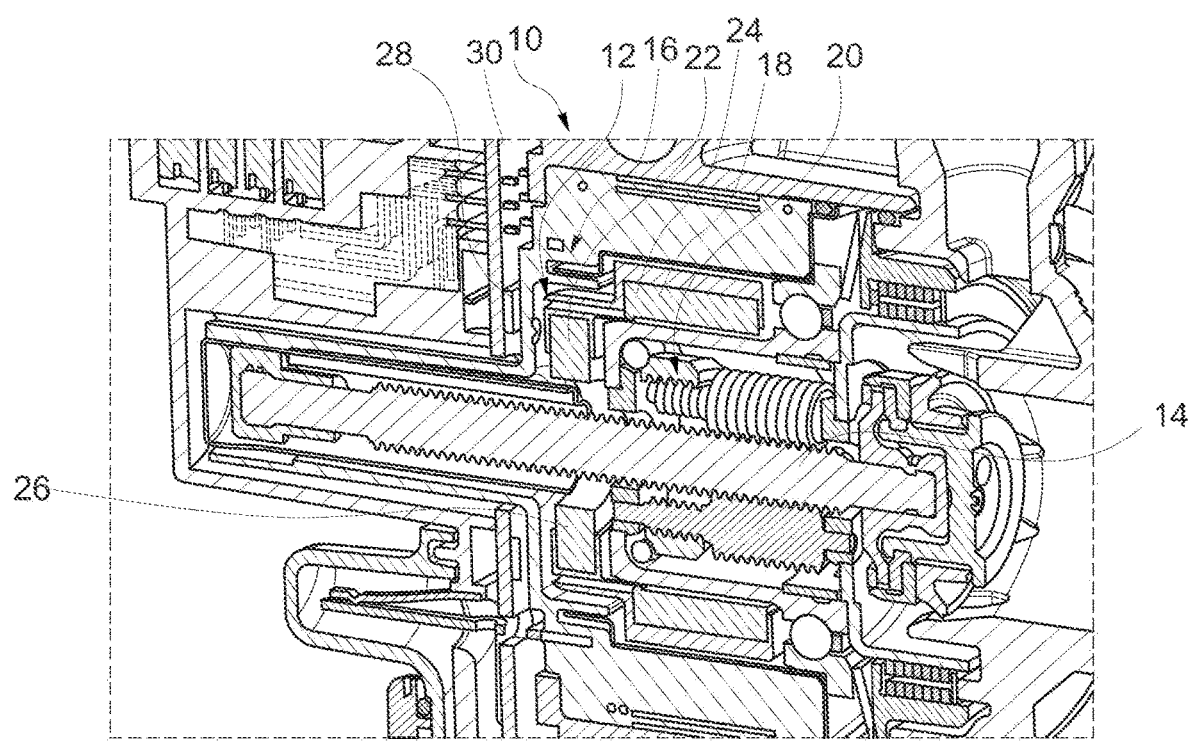
FIG. 1: shows a spatial cross-section through a clutch actuator with a sensor unit in an exemplary embodiment of the disclosure.

FIG. 1 shows a spatial cross-section through a clutch actuator 10 with a sensor unit 12 in an exemplary embodiment of the disclosure. The clutch actuator 10 is a modular clutch actuator, a so-called MCA, comprising a spindle 14 and an electric motor 16 with a rotatable rotor 18. The spindle 14 performs a linear movement for clutch actuation and is moved by a rotational movement of the electromechanically driven rotor 18 via a planetary roller screw drive 20, abbreviated PWG.

The sensor unit 12 is arranged to detect an angular position of the rotor 18 and has a rotational element 22, which is embodied as a magnetic ring 26 non-rotatably connected to a rotational component 24 embodied as the rotor 18. The magnetic ring 26 is, in particular, a permanent magnet and diametrically magnetized. The sensor unit 12 also has a sensor element 28, which is embodied as a magnetic sensor, in particular as a Hall sensor. The sensor element 28 is mounted on a circuit board 30 axially spaced from the rotational element 22 and enables a magnetic field emanating from the rotational element 22 to be detected.

The effect of the magnetic field emanating from the rotational element 22 on the sensor element 28 makes it possible to detect the angular position of the rotational component 24, i.e., the rotor 18, since the diametric magnetization of the magnetic ring 26 causes the magnetic field to change as a function of the angular position of the rotor 18.

Figure 2:
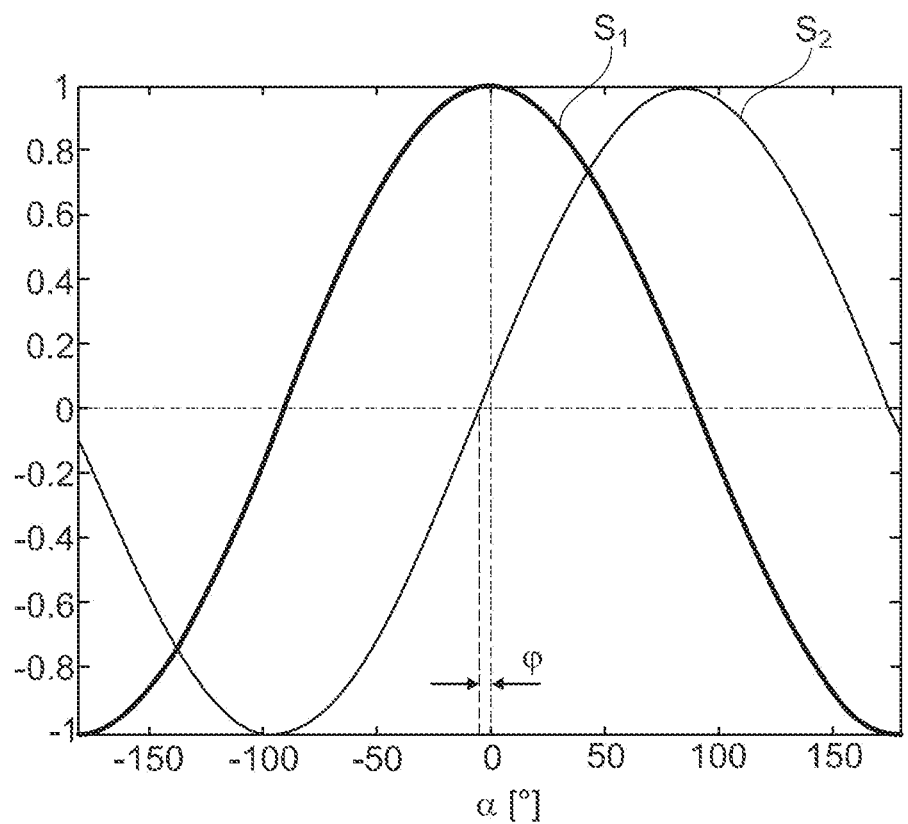
FIG. 2: shows a respective course of the first and second sensor signal depending on the angular position.

FIG. 2 shows a respective curve of first and second sensor signals $S_1$, $S_2$ as a function of the angular position $\alpha$. The first sensor signal $S_1$ and the second sensor signal $S_2$ are each a periodic signal. The first sensor signal $S_1$ is a cosine signal and the second sensor signal $S_2$ is a sinusoidal signal, but it has an orthogonal error with respect to the cosine signal expressed by the offset angle $\varphi$. However, an exact determination of the angular position $\alpha$ based on the first and second sensor signal $S_1$, $S_2$ using an a tan 2 function requires an orthogonality of both sensor signals $S_1$, $S_2$. If a deviation from this is not taken into account, the determined angular position $\alpha$ can be subject to an angular error depending on the orthogonal error.

Figures 3A, 3B:
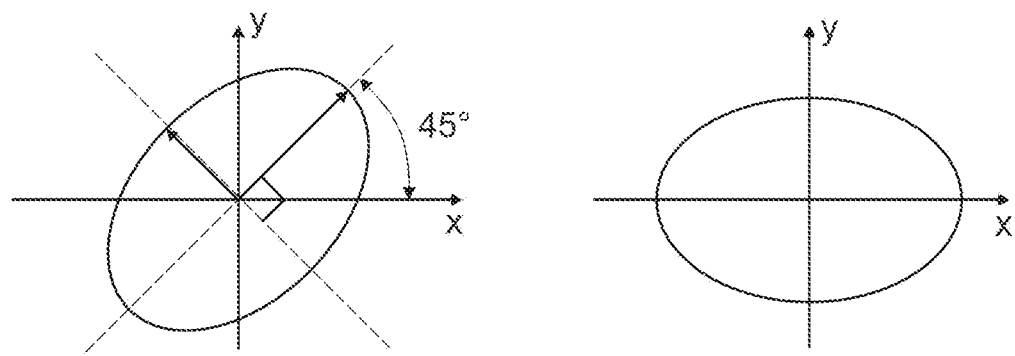
FIG. 3a: shows a curve graph of the first and second sensor signals.
FIG. 3b: shows a curve graph of the respective converted first and second sensor signals.

FIG. 3a shows a curve graph of the first and second sensor signals $S_1$, $S_2$. The first sensor signal $S_1$ is plotted on the x-axis and the second sensor signal $S_2$ is plotted on the y-axis. If both sensor signals $S_1$, $S_2$ were ideally orthogonal to one another, a circular curve graph would be the result. Due to the orthogonal error, the curve graph corresponding to the first and second sensor signals $S_1$, $S_2$ deviates from this and can be described by an ellipse with a major axis extending along an angle of 45°.

An orthogonal error between the first sensor signal $S_1$ and the second sensor signal $S_2$ affecting the angular position $\alpha$ can be described by the offset angle $\varphi$ according to (1). Knowing the offset angle $\varphi$, a second sensor signal $S^{}_2$ adjusted for the orthogonal error can be calculated according to (2). However, calculating the offset angle $\varphi$ using conventional methods is time-consuming, involves high computing power and is uneconomical to perform while the sensor unit 12** is in operation.

Instead of determining the offset angle $\varphi$, the orthogonal error can be converted in a conversion step via a coordinate transformation of the first and second sensor signals $S_1$, $S_2$ into an amplitude difference of the amplitudes a, b of the sensor signals $S_1$, $S_2$ according to (3) and output as converted sensor signals $S_1$, $S_2$.

FIG. 3b shows a curve graph of the converted first and second sensor signals $S^*_1$, $S^*_2$. The coordinate transformation is achieved by a coordinate rotation of 45°, corresponding to the rotation matrix according to (4). This results in an ellipse rotated 45° to that of FIG. 3a. The amplitudes a, b of the converted sensor signals $S^*_1$, $S^*_2$ can thus be further evaluated by determining an amplitude difference according to (9).

Figure 4:
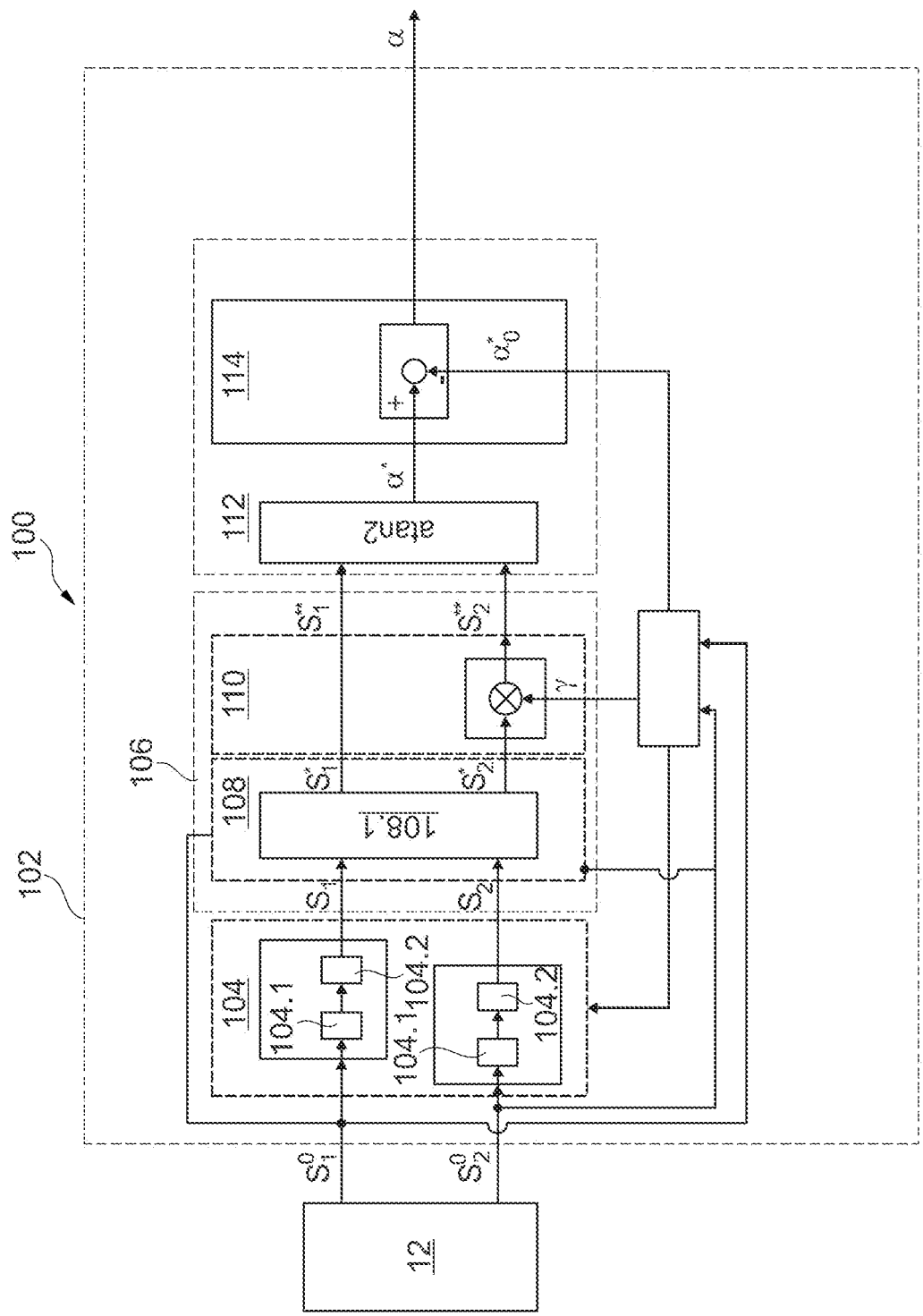
FIG. 4: shows a sequence of a method in an exemplary embodiment of the disclosure.

FIG. 4 shows a sequence of a method 100 in an exemplary embodiment of the disclosure. The method 100 detects an angular position $\alpha$ of a rotational component 24 that can rotate about a rotational axis via a sensor unit 12, which outputs an unprocessed first sensor signal $S_1^0$ dependent on the angular position $\alpha$ and associated with a first detection position as well as an unprocessed second sensor signal $S_2^0$ associated with a second detection position lying about the rotational axis perpendicular to the first detection position to an evaluation unit 102.

Figure 5:
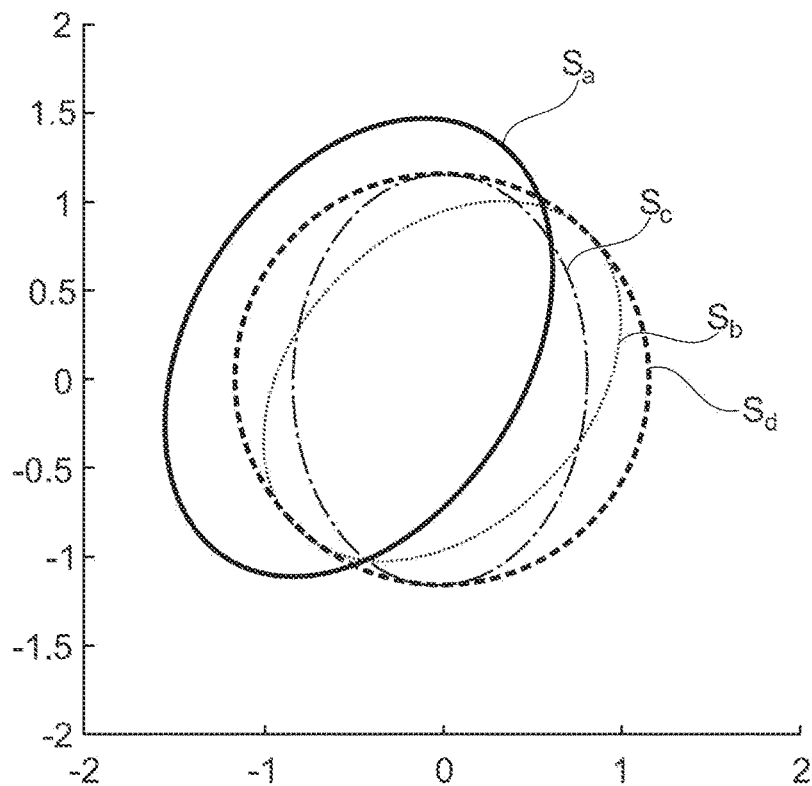
FIG. 5: shows a respective curve graph of the sensor signals according to the individual steps of the method according to FIG. 4.
Figure 6:
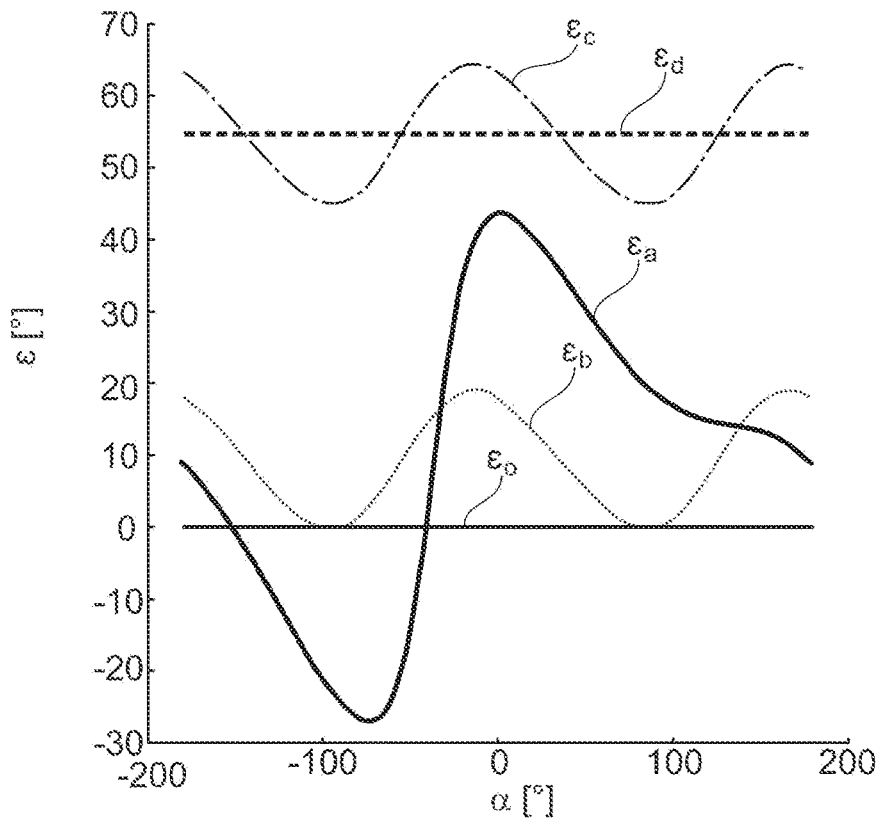
FIG. 6: shows a respective angular error curve of the sensor signals according to the individual steps of the method according to FIG. 4.

The evaluation unit 102 calculates the angular position $\alpha$ from the unprocessed first and second sensor signals $S_1^0$, $S_2^0$ by means of several steps. FIG. 5 shows a respective curve graph of the sensor signals output after the individual steps of this method and FIG. 6 shows a respective angular error graph of the angular error E of the sensor signals output after the corresponding steps of this method. Unless otherwise stated, the following explanation refers to the method according to FIG. 4, but explicitly refers to FIG. 5 and FIG. 6 in places.

The unprocessed sensor signal Sa in FIG. 5 causes the angular error Ea shown in FIG. 6. The angular error fa reaches high values, which make the detection of the angular position $\alpha$ unreliable if it is not taken into account. The angular error a can be significantly reduced by the subsequent further steps of the method.

The unprocessed first and second sensor signals $S_1^0$, $S_2^0$ are first transferred to a normalization step 104, which performs an offset correction 104.1 and an amplitude correction 104.2 of the unprocessed first and second sensor signals $S_1^0$, $S_2^0$ and outputs them as first and second sensor signals $S_1$, $S_2$ respectively.

The corresponding sensor signal Sb after the normalization step 104 is shown in FIG. 5 and, with respect to FIG. 6, is subject to a reduced angular error $\epsilon_b$, the amplitude of which has been reduced by more than 50% compared to the amplitude of the angular error $\epsilon_a$.

The first and second sensor signals $S_1$, $S_2$ are output to a subsequent correction step 106, which includes a conversion step 108 and a subsequent calculation step 110. The first and second sensor signals $S_1$, $S_2$ are converted in the conversion step 108 by a coordinate transformation 108.1, and thereby the orthogonal error of the first and second sensor signals $S_1$, $S_2$ is converted into an amplitude difference of the amplitudes a, b of the sensor signals $S_1$, $S_2$ via the coordinate transformation according to (3). Here, a phase shift $\alpha_0$ of the two sensor signals $S_1$, $S_2$ is also taken into account. The coordinate transformation 108.1 is achieved by a coordinate rotation of 45°, with the rotation matrix according to (4).

The corresponding sensor signal Sc in FIG. 5 is illustrated as an ellipse rotated by 45°. The resulting angular error $\epsilon_c$ in FIG. 6 is offset by 45° from the angular error $\epsilon_b$.

The respective converted first and second sensor signals $S^*_1$, $S^*_2$ can be calculated from the first and second sensor signals $S_1$, $S_2$ via (5). Since the converted first and second sensor signals $S^*_1$, $S^*_2$ are transferred as arguments to an a tan 2 function in an evaluation step 112 following the correction step 106 for calculating the angular position $\alpha$, the converted sensor signals $S^*_1$, $S^*_2$ can also be calculated while omitting the prefactor according to (6).

In a calculation step 110 associated with the correction step 106 and subsequent to the conversion step 108, an amplitude $A^*_1$ of the converted first sensor signal $S^*_1$ according to (7) and an amplitude $A^*_2$ of the converted second sensor signal $S^*_2$ according to (8) are taken into account. An amplitude difference $\gamma$ is determined via (9) and used in the calculation step 110 to adjust the amplitude $A^*_2$ of the converted second sensor signal $S^*_2$ according to (10). The converted first and second sensor signals $S^*_1$, $S^*_2$ are subsequently transferred to the evaluation step 112 as an adjusted first sensor signal $S^{}_1$ and as an adjusted second sensor signal $S^{}_2$.

The adjusted sensor signal Sd in FIG. 5 corresponds to a circle. The associated angular error $\epsilon_d$ shown in FIG. 6 is constant.

In the evaluation step 112, the angular position $\alpha^*$ is calculated using an a tan 2 function with the adjusted first and second sensor signals $S^{}_1$, $S^{}_2$. The evaluation step 112 includes a phase correction step 114 in which the phase shift ac is compensated for by a phase correction $\alpha^*_0$ according to (15). The angular position $\alpha$ is then output for further processing.

The angular error $\epsilon_D$ in FIG. 6 is reduced to the maximum extent.

Figure 7:
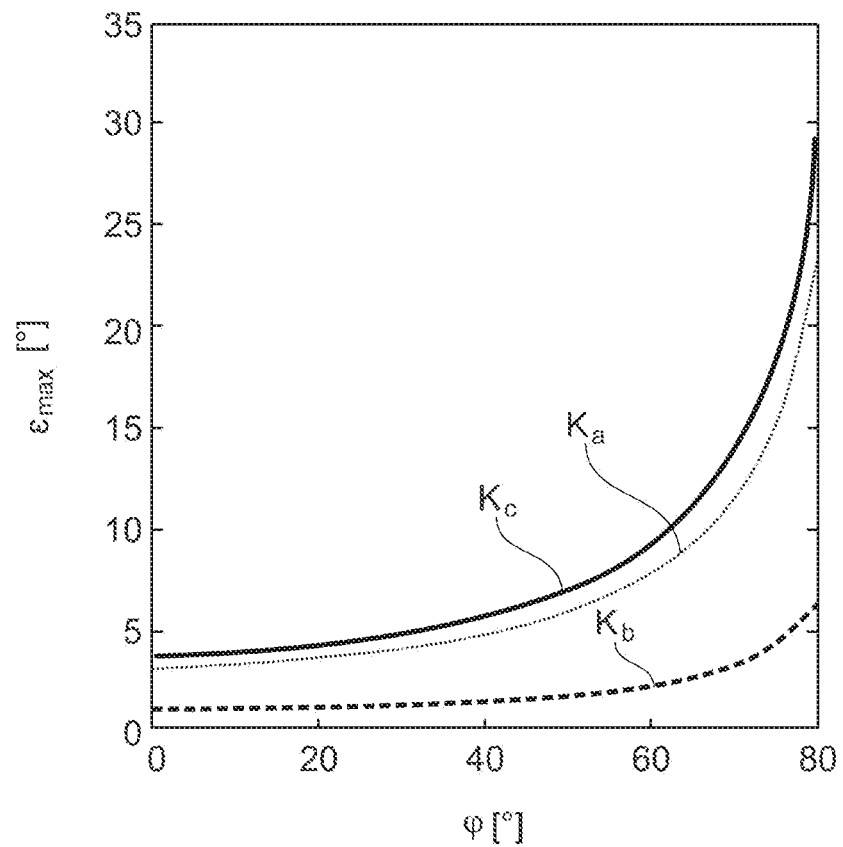
FIG. 7: shows a dependence of the maximum angular error on the orthogonal error when using the method in an exemplary embodiment of the disclosure.

FIG. 7 shows a dependence of the maximum angular error $\epsilon_{max}$ on the orthogonal error when using the method in an exemplary embodiment of the disclosure. The orthogonal error is expressed by the offset angle $\varphi$. The maximum angular error $\epsilon_{max}$ is the more proportional to the offset angle $\varphi$. The array of curves shows the influence of noise and harmonic distortions on the sensor signals.

The curve Ka corresponds to a sensor signal influenced by harmonic disturbances, the curve Kb to a sensor signal influenced by noise and the curve Kc to a sensor signal influenced by both disturbances. Even with an offset angle $\varphi$ of 20°, the maximum angular error $\epsilon_{max}$ can be kept low by utilizing this method.

LIST OF REFERENCE SYMBOLS

10 Clutch actuator
12 Sensor unit
14 Spindle
16 Electric motor
18 Rotor
20 Planetary screw drive
22 Rotary element
24 Rotary component
26 Magnetic ring
28 Sensor element
30 Board
100 Method
102 Evaluation unit
104 Normalization step
104.1 Phase correction
104.2 Amplitude correction
106 Correction step
108 Conversion step
108.1 Coordinate transformation
110 Calculation step
112 Evaluation step
114 Phase correction step
$\alpha$ Angular position
$\alpha_0$ Phase shift
$\alpha^*_0$ Phase correction
$\epsilon$ Angular error
$\epsilon_{max}$ Maximum angular error
$\gamma$ Amplitude difference
Ka Curve
Kb Curve
Kc Curve
$\varphi$ Offset angle
$S_1$ First sensor signal
$S_2$ Second sensor signal
Sa Sensor signal
Sb Sensor signal
Sc Sensor signal
Sd Sensor signal
$S_1^0$ Unprocessed first sensor signal
$S_2^0$ Unprocessed second sensor signal
$S^*_1$ Converted first sensor signal
$S^*_2$ Converted second sensor signal
$S^{**}_1$ Adjusted first sensor signal
$S^{**}_2$ Adjusted second sensor signal

The invention claimed is:

1. A method for detecting an angular position of a rotational component rotatable about a rotational axis, the method comprising:
providing, via a sensor unit, a first sensor signal and a second sensor signal to an evaluation unit, wherein the first sensor signal is dependent on the angular position and is associated with a first detection position, and the second sensor signal is associated with a second detection position lying about the rotational axis perpendicular to the first detection position;
converting, via the evaluation unit, an orthogonal error into an amplitude difference between respective amplitudes of the first and second sensor signals based on a coordinate transformation of the first and second sensor signals;
adjusting, via the evaluation unit, each of the first and second sensor signals based on the amplitude difference;
determining, via the evaluation unit, the angular position based on output from an a tan 2-function that takes the adjusted first and second sensor signals as input;
determining, via the evaluation unit, a common phase shift of the first and second sensor signals, wherein the phase shift is determined after applying the a tan 2-function; and
adjusting, via the evaluation unit, the angular position based on the phase shift.

2. The method according to claim 1, further comprising converting, via the evaluation unit, the first and second sensor signals based on the coordinate transformation.

3. The method according to claim 2, wherein each of the converted first and second signals are adjusted based on the amplitude difference.

4. The method according to claim 1, wherein the coordinate transformation comprises a coordinate rotation of 45°.

5. The method according to claim 4, wherein the coordinate transformation is performed as subtraction and addition of the first and second sensor signals, respectively.

6. The method according to claim 1, further comprising, prior to converting the orthogonal error, performing, via the evaluation unit, at least one of an offset correction or an amplitude correction of the first and second sensor signals.

7. The method according to claim 1, wherein the sensor unit includes:
a fixed sensor element; and
a rotational element that can rotate relative to the sensor element and jointly with the rotational component.

8. The method according to claim 7, wherein the sensor element is axially spaced from the rotational element.

9. A detection system for detecting an angular position of a rotational component rotatable about a rotational axis, the detection system comprising:
- an evaluation unit; and
- a sensor unit comprising a fixed sensor element and a rotational element that is rotatable relative to the sensor element and jointly with the rotational component, the sensor element being axially spaced from the rotational element, the sensor unit is configured to provide a first sensor signal and a second sensor signal to the evaluation unit, wherein the first sensor signal is dependent on the angular position and is associated with a first detection position, and the second sensor signal is associated with a second detection position lying about the rotational axis perpendicular to the first detection position;
- wherein the evaluation unit is configured to:
    - convert an orthogonal error into an amplitude difference between respective amplitudes of the first and second sensor signals based on a coordinate transformation of the first and second sensor signals;
    - adjust each of the first and second sensor signals based on the amplitude difference; and
    - determine the angular position based on output from an a tan 2-function that takes the adjusted first and second sensor signals as input.

10. A clutch actuator for a clutch, having a detection system according to claim 9.

11. The detection system according to claim 9, wherein the evaluation unit is further configured to convert the first and second sensor signals based on the coordinate transformation.

12. The detection system according to claim 11, wherein each of the converted first and second signals are adjusted based on the amplitude difference.

13. The detection system according to claim 9, wherein the coordinate transformation comprises a coordinate rotation of 45°.

14. The detection system according to claim 13, wherein the coordinate transformation is performed as subtraction and addition of the first and second sensor signals, respectively.

15. The detection system according to claim 9, wherein the evaluation unit is further configured to, prior to converting the orthogonal error, perform at least one of an offset correction or an amplitude correction of the first and second sensor signals.

16. The detection system according to claim 9, wherein the evaluation unit is further configured to:
- determine a common phase shift of the first and second sensor signals; and
- adjust the angular position based on the phase shift.

* * * * *